United States Patent [19]

Crisafulli

[11] Patent Number: 5,046,448
[45] Date of Patent: Sep. 10, 1991

[54] RAILROAD TIE TREATING METHOD AND APPARATUSES

[76] Inventor: Joseph T. Crisafulli, P.O. Box 865, Glendive, Mont. 59330

[21] Appl. No.: 439,321

[22] Filed: Nov. 21, 1989

[51] Int. Cl.[5] ........................ B05B 13/02; B05C 5/00

[52] U.S. Cl. .................................. 118/305; 427/397; 427/369; 222/175; 156/579

[58] Field of Search ............... 239/159, 160, 161, 162, 239/163, 164, 165, 166, 167; 222/610, 175; 118/305; 156/579; 427/397, 369

[56] References Cited

U.S. PATENT DOCUMENTS

| | | | |
|---|---|---|---|
| 2,363,776 | 11/1944 | Dale | 239/160 |
| 2,692,799 | 10/1954 | Parrott | 239/166 |
| 2,995,307 | 8/1961 | McMahon | 239/166 |
| 3,099,582 | 7/1963 | Ongstad et al. | 156/579 |
| 3,173,166 | 4/1963 | Christensen | 156/579 |
| 4,095,726 | 6/1978 | Hechler, IV et al. | 222/175 |
| 4,738,878 | 4/1988 | Anderson et al. | 427/369 |
| 4,746,553 | 5/1988 | Crisafulli | 427/397 |

*Primary Examiner*—Richard Bueker
*Assistant Examiner*—Robert Barker
*Attorney, Agent, or Firm*—Fleit, Jacobson, Cohn, Price, Holman & Stern

[57] ABSTRACT

A method and apparatuses for treating railroad ties by injecting a flowable treating material through unused or unoccupied spike holes in railroad rail tie plates which anchor the bottom flange of a railroad rail to the wooden ties. In one embodiment of the invention, the apparatus includes a backpack unit including a tank and pump assembly secured to the back of a user by shoulder straps with a manually manipulated injector device insertable into an unused or unoccupied spike hole in a tie plate in a sealed relationship thereto. The injector or applicator includes a rigid tubular member having a nozzle and valve at the lower end, a T-handle at the upper end and a valve actuator associated with one of the handgrip areas of the T-handle with the T-handle also being connected with a flexible hose communicated with the supply tank and pump assembly thereby enabling a user to walk alongside a railroad rail and inject treating material through the unoccupied spike holes and between the upper surface of the wooden tie and the bottom surface of the tie plate for protecting the wooden tie from fungi and other conditions which cause decay of the wooden tie. In another embodiment of the invention, the treating apparatus is mounted on a pickup truck or other vehicle which can be driven alongside a pair of railroad rails with the vehicle including a pair of adjustable, collapsible and foldable booms supporting supply hoses interconnecting a supply tank and pump assembly with manually manipulated injectors.

10 Claims, 2 Drawing Sheets

RAILROAD TIE TREATING METHOD AND APPARATUSES

BACKGROUND OF THE INVENTION

1. Field of the Invention

The present invention relates to a method and apparatuses for treating railroad ties by injecting a flowable-treating material through unused or unoccupied spike holes in railroad rail tie plates which anchor the bottom flange of a railroad rail to the wooden ties. In one embodiment of the invention, the apparatus includes a backpack unit including a tank and pump assembly secured to the back of a user by shoulder straps with a manually manipulated injector device insertable into an unused or unoccupied spike hole in a tie plate in a sealed relationship thereto. The injector or applicator includes a rigid tubular member having a nozzle and valve at the lower end, a T-handle at the upper end and a valve actuator associated with one of the handgrip areas of the T-handle with the T-handle also being connected with a flexible hose communicated with the supply tank and pump assembly thereby enabling a user to walk alongside a railroad rail and inject treating material through the unoccupied spike holes and between the upper surface of the wooden tie and the bottom surface of the tie plate for protecting the wooden tie from fungi and other conditions which cause decay of the wooden tie. In another embodiment of the invention, the treating apparatus is mounted on a pickup truck or other vehicle which can be driven alongside a pair of railroad rails with the vehicle including a pair of adjustable, collapsible and foldable booms supporting supply hoses interconnecting a supply tank and pump assembly with manually manipulated injectors.

2. Information Disclosure Statement

The concept of treating wooden ties by injecting a flowable treating material through the unused or unoccupied spike holes in railroad tie plates is disclosed in my prior Pat. No. 4,746,553 issued May 24, 1988 with the apparatus disclosed in that patent including a vehicle with flanged wheels to support the vehicle on the railroad rails and which operates effectively for its purposes but requires that the vehicle be removed from the rails, either by moving onto a siding or being manually removed from the railroad rails, when a train passes the site of treatment. Prior Pat. No. 4,738,878 issued Apr. 19, 1988 also discloses the method of treating the upper surface of wooden railroad ties by injecting a treating material into one or more unoccupied spike holes in rail supporting tie plates with the only apparatus disclosed including an injector element with a nozzle on the end thereof for engaging the spike hole in the tie plate. Neither of the above patents and the prior art cited in those patents disclose the method and apparatuses of this invention.

SUMMARY OF THE INVENTION

An object of the present invention is to provide a method of treating wooden railroad ties by injecting treating material through the unused or unoccupied spike holes in a railroad rail tie plate with the method including the step of supporting the source of treating material for mobile movement without being dependent upon the railroad rails for support of the apparatus thereby providing a treatment method having a high degree of flexibility and maneuverability in use.

Another object of the invention is to provide a user mounted apparatus in the form of a backpack tank and pump connected to an injector through a flexible hose to enable the user to move in any direction in relation to the wooden ties, tie plates and rails to enable optimum access to the tie plates and yet enable the user to move away from the tie plates when necessary.

A further object of the invention is to provide an apparatus for treating wooden railroad ties which includes a supply tank and pump assembly mounted on a pickup truck or similar vehicle capable of mobile movement alongside a railroad track without actually being mounted on the railroad rails or other track structure with the vehicle including booms supporting supply hoses connected to a user manipulated injector which provides flexibility of use but maintains the source of treating material on a supporting vehicle that is not limited as to its movement in relation to the railroad components.

A still further object of the invention is to provide a railroad tie treating method and apparatuses as set forth in the preceding objects which is relatively inexpensive in construction, easy and efficient to use, flexible in its mode of use since the apparatus is not tied to or restricted by it being supported by the railroad rails thereby providing a more versatile treating method and apparatuses.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
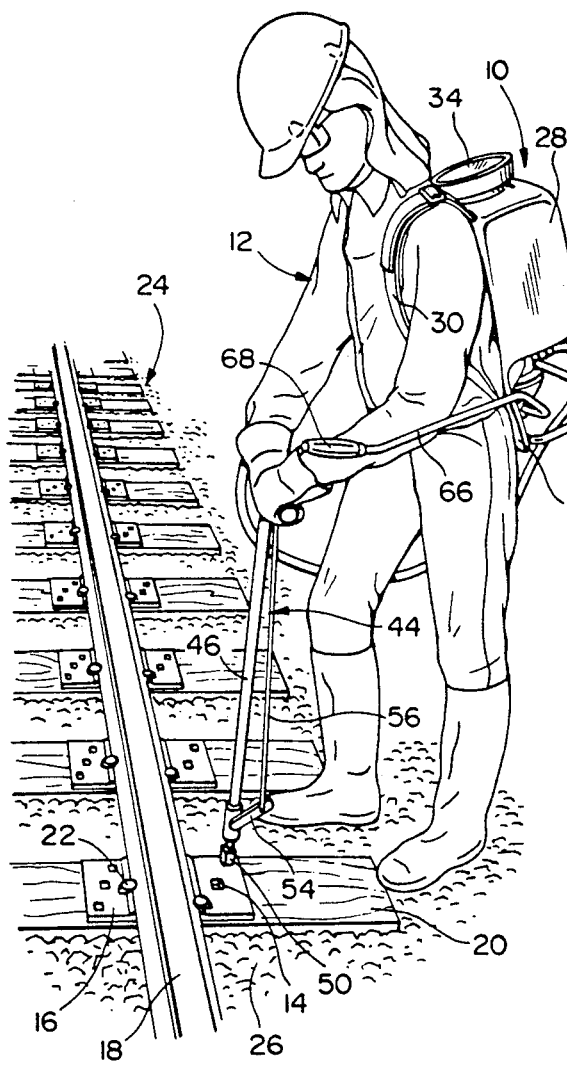
FIG. 1 is a perspective view of the backpack mounted railroad tie treating apparatus of the present invention illustrating its manner of use.
Figure 2:
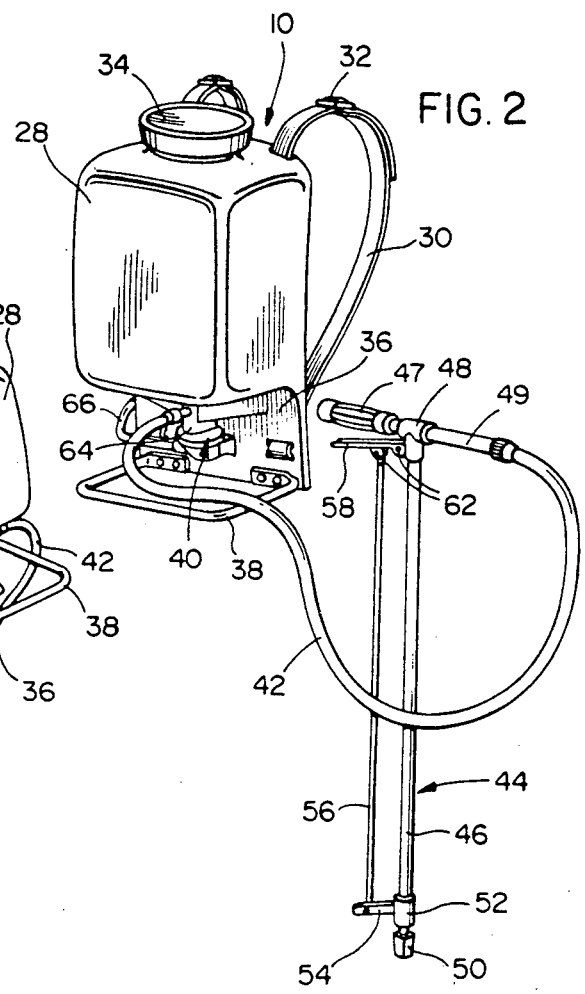
FIG. 2 is a perspective view of the apparatus.
Figure 3:
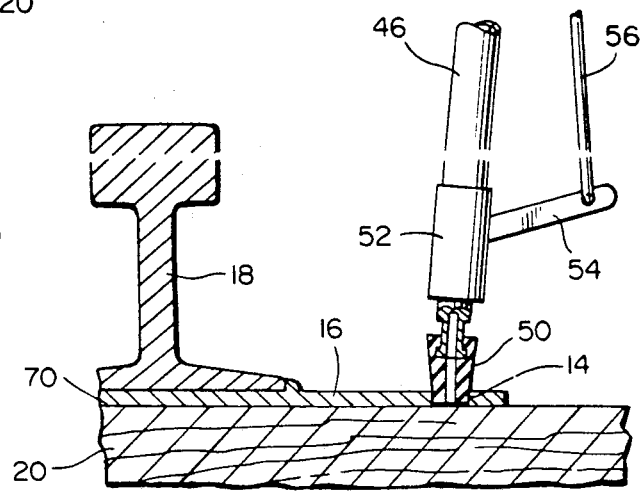
FIG. 3 is a sectional view illustrating the association of the nozzle and the tie plate hole.
Figure 4:
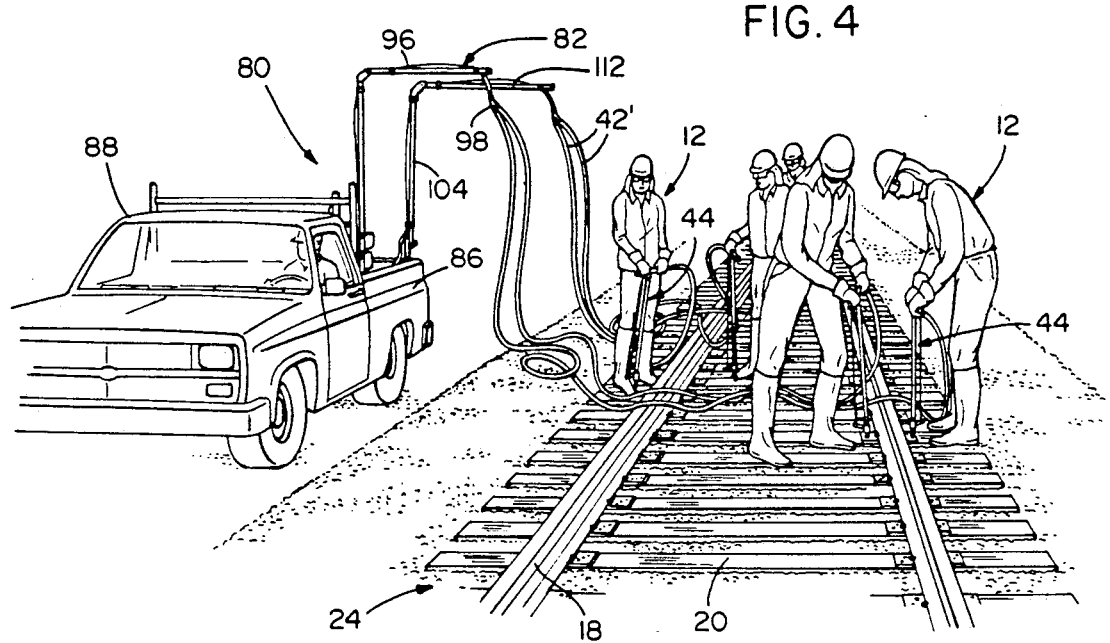
FIG. 4 is a perspective view of the pickup truck mounted railroad tie treating apparatus illustrating its manner of use.
Figure 5:
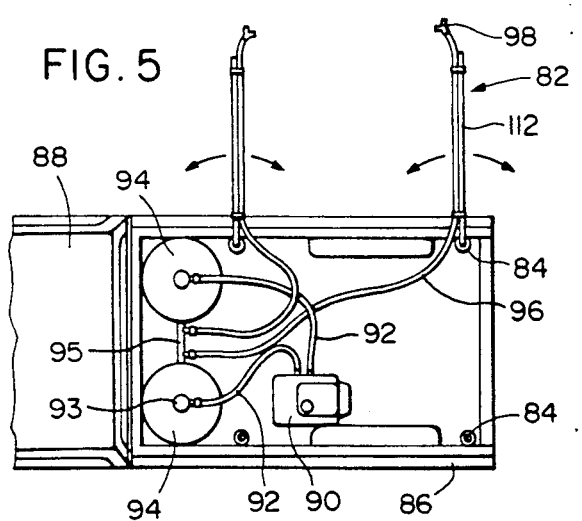
FIG. 5 is a plan view of the pickup body with the components of the apparatus illustrated thereon.
Figure 6:
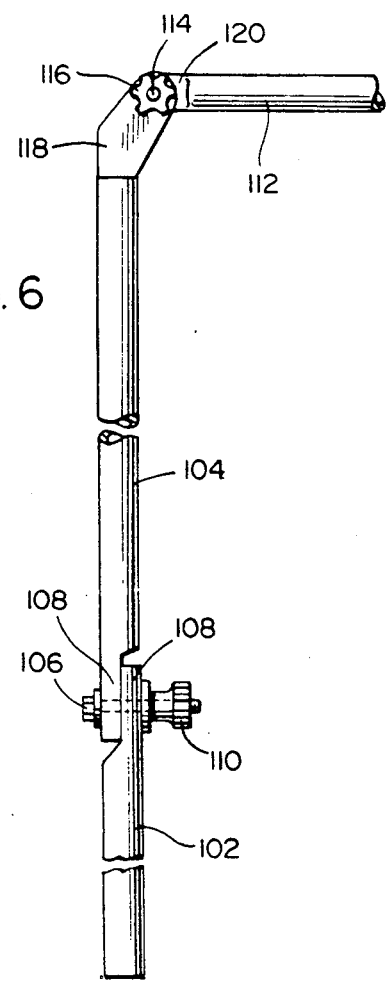
FIG. 6 is a detailed, elevational view illustrating the foldable and collapsing characteristics of the hose supporting booms.

Referring now specifically to FIGS. 1-3 of the drawings, the backpack embodiment of the present invention is generally designated by reference numeral 10 supported from a user generally designated by the numeral 12 to enable the user to inject a liquid or paste-like flowable treating material through an unused hole or holes 14 in tie plates 16 which anchor railroad rails 18 to wooden railroad crossties 20 by the use of spikes 22 to form a railroad bed 24 which includes ballast 26 in the form of rock and the like with the railroad bed 24, rails, ties, tie plates and spikes all being of conventional construction. The backpack form of the apparatus 10 includes a supply tank 28 supported from the back of the user 12 by a pair of flexible shoulder straps 30 having buckle structures 32 enabling adjustment of the shoulder straps 30 to fit the user. The tank 28 includes a large removable closure cap 34 at its upper end to enable the supply of treating material in the tank to be replenished when necessary. The tank 28 is generally of square or rectangular, cross-sectional configuration and the inner wall thereof which engages the back surface of the user 12 is provided with a downwardly extending plate 36 to which the lower end of the shoulder straps 30 are attached and the bottom of the plate 36 is provided with a generally U-shaped rod-like structure 38 underlying the bottom of the tank and rigid with the plate 36 to form a support for the tank 28 when it is resting on a surface. As illustrated, the vertical height of the tank 28 and plate 36 is such that it will extend from the waist area to the upper surface of the shoulder area so that it can be comfortably carried by the user for long periods of time. The lower end of the tank 28 is provided with a pump assembly 40 having a flexible hose 42 connected thereto and extending therefrom to provide a supply of flowable treating material to an injector or applicator generally designated by reference numeral 44 which includes an elongated, rigid tubular member 46 having a T-fitting 48 at the upper end with a handgrip 47 on one side thereof and a tubular handle 51 on the other which may also have a handgrip if desired. The hose 42 is connected to the tubular member 52 for supplying treating material to the rigid tubular member 46 which has a nozzle 50 at the lower end thereof which is tapered and constructed of resilient or elastomeric material as illustrated in FIG. 3 for insertion into a spike hole 14 in sealed relation. The lower end of the tubular member 46 is provided with a valve 52 having a laterally extending actuator 54 to control discharge of treating material through the nozzle 50. The actuator 54 is connected to an operating rod 56 at its outer end with the rod 56 extending upwardly and being pivotally connected to a handle 58 as indicated at 60 with the handle 58 being pivotally connected to the T-fitting 48 at 62 thus providing a manual control for the valve 52 for controlling discharge of treating material from the nozzle 50 in substantially the same manner as disclosed in my prior Pat. No. 4,746,553.

The pump assembly 40 at the lower end of the tank 28 includes a pump structure 64 which includes a laterally and forwardly extending operating handle 66 terminating in a handgrip 68 at its forward end. As illustrated in FIG. 1, the handle 66 and handgrip 68 extend forwardly alongside the user at generally waist level and terminate generally adjacent the T-handle structure of the injector 44 thereby enabling the user 12 to manually grasp the handgrip 68 and swing it in a vertical arc to operate the pump 64 thereby pressurizing the liquid or paste-like treating material that will be pumped from the tank 28, through the pump 64 and through the hose 42 into the tubular member 46 for discharge through the nozzle 50 into the interface 70 between the upper surface of the wooden railroad tie 20 and the bottom surface of the tie plate 16.

This backpack arrangement provides a completely self-contained treating apparatus that is not dependent upon any external power source, not dependent upon any vehicular structure and not restricted as to its movement during use and in no way restricted in its movement by the railroad bed components since the user 12 may walk along either side of the rail or straddle the rail to sequentially pump treating material downwardly through the unused or unoccupied holes in the tie plates with the user being capable of walking away from the railroad bed when a train passes and also capable of walking to a storage site for treating material in order to refill the tank 28 when necessary. The user also is capable of providing the desired and necessary pressure to effectively and efficiently inject the treating material into the interface 70 and, by watching the peripheral area of the tie plate, the user can determine when a sufficient quantity of material has been injected by observing when such material egresses from the periphery of the tie plate.

Referring now specifically to FIGS. 4-7 of the drawings, the pickup truck mounted embodiment of the treating apparatus of the present invention is generally designated by reference numeral 80 with the railroad bed being the same as in FIGS. 1-3 with the apparatus including a plurality of injectors which are identical in construction to the injector disclosed in FIGS. 1-3 with the same reference numerals being used to designate identical components. In this embodiment of the invention, the treating apparatus 80 includes a plurality of flexible hoses 42' with each hose being connected to an injector 44 operated and manipulated by a user 12. As illustrated, four users and four injectors are used to efficiently inject treating material through the tie plates along both sides of each railroad rail 18 with the hoses being of sufficient length to enable the users 12 to approach, walk alongside the rail and leave the railroad bed when necessary such as when a train passes the site of treatment.

The pickup truck mounted treating apparatus 80 includes a pair of booms 82 which are detachably and swivelly mounted in a pair of vertical sleeves 84 mounted along each side wall 86 of the pickup truck load body thus enabling the booms 82 to be mounted either on the left or right side of the pickup truck 88 thus enabling the truck 88 to be driven along either side of the railroad bed 24. Mounted in the pickup truck loadbed is an air compressor 90 having a pair of discharge hoses 92 connected thereto. Each hose 92 extends to an air powered pump unit 93 mounted on top of each of a pair of supply drums 94 containing treating material therein. The air compressor 90 is powered by a small air cooled internal combustion engine and may be provided with a pressure tank and controls. The pump units 93 are commercially available pump units such as those manufactured by Greyco. The pump units 93 extend into the drums 94 and discharge laterally into a manifold or T-connection 95 extending between the drums 94. Two hoses 96 are connected to manifold 95 and one of the hoses 96 extends along each boom 82 to a Y-connection or fitting 98 at the end of the boom to which hoses 42' are connected. Valves may be provided in the air hoses 92, manifold 95 and hoses 96 to control discharge from either or both drums and the pumps are associated with drums to circulate at least a portion of the treating material to maintain it agitated and in proper condition for pumping into the hoses 42' and the injectors 44.

Figure 7:
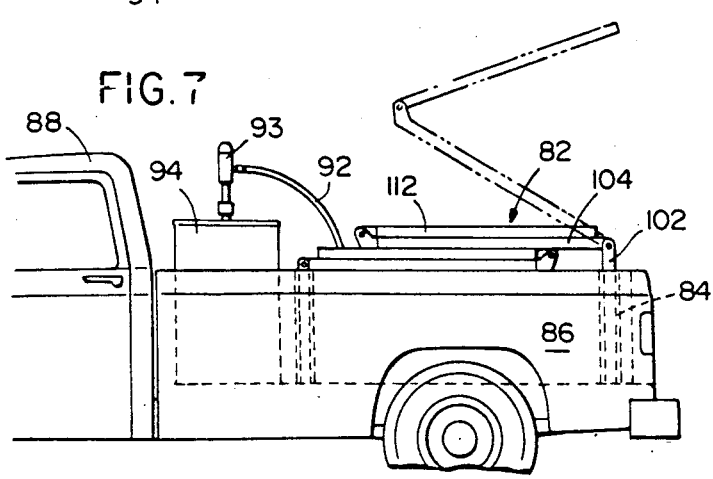
FIG. 7 is an elevational view illustrating the manner in which the booms are folded into a collapsed condition on the pickup truck.

Each boom 82 includes a plurality of rod-like or tubular members including a lower tubular member 102 that is telescopically received in the tubular sleeves or stake pockets 84 on the side walls 86 of the pickup truck body with the vertical length of the tubular sleeve being substantially equal to the height of the wall 86 as illustrated in FIG. 7 to enable the boom to swivel about the vertical axis of the member 102. An upper vertical tubular member 104 has its lower end connected to the upper end of the lower tubular member 102 by a pivot bolt 106 extending through flattened end portions 108 of the tubular members 102 and 104 with the bolt 106 including a manually operated and peripherally serrated handwheel or nut 110 to secure the tubular members 102 and 104 in vertical alignment or to permit the member 104 to fold downwardly alongside the upper edge of the wall 86 of the pickup truck load body as illustrated in FIG. 7. Each boom 82 also includes a horizontal tubular support member 112 pivotally connected to the upper end of the tubular member 104 by a pivot bolt 114 having a nut or handwheel 116 thereon extending through a flattened and offset upper end portion 118 on the tubular member 104 and a flattened end portion 120 on the tubular member 112 thus enabling the tubular member 112 to fold to a position alongside the tubular member 104 as illustrated in broken line in FIG. 7. This structure also enables the booms to fold down into overlying position or a position alongside each other to enable over-the-road movement of the pickup truck 88 with the hoses 42' and the injectors 44 stored in the pickup truck body thereby enabling easy transport and handling of the components of the invention. The hoses 96 are supported on the horizontal tubular members 112 by encircling flexible straps 122 or by any other means to retain the hoses 96 alongside the boom with the Y-connection 98 being disposed closely adjacent the outer end of the horizontal tubular member 112.

With this construction, the boom 82 may swivel about a vertical axis and be secured in the generally inverted L-shaped configuration when in use or folded into a collapsed condition as illustrated in FIG. 7 thereby enabling the pickup truck to be effectively driven over the road to the site of use and the booms deployed and effectively used from either side of the pickup truck and then being folded into a collapsed position after the treatment has been completed or at the end of a work day. The flexible hoses enable the users to move along the railroad bed as desired and enables the plurality of users to more rapidly treat the wooden ties under the tie plates along both rails. The use of the horizontally disposed tubular members 112 at the upper ends of the tubular members 102 and 104 which form a vertical mast, enables the hoses to be retained out of the way and more easily movable by the users and enables the injectors or wands to have easier access to the unoccupied holes in the tie plates. While a pickup truck has been illustrated, this same structure could be utilized on various types of trucks and other vehicles, especially those capable of safely traversing uneven ground surfaces which frequently are encountered alongside railroad beds 24 thereby providing a highly flexible and versatile apparatus for injecting wood preservative, fungicidal agents or other treating material through the unused holes in the tie plates while maintaining a seal between a nozzle and the hole in the tie plate to force the treating material in the interface between the wooden tie and tie plate.

In using the apparatuses, each apparatus provides the mobile support of a supply of treatment material which is not constrained by the support being connected to the railroad rails. Each embodiment of the apparatus also includes the step of providing a pressurized supply of treating material through a flexible supply line to enable manually manipulated and controlled movable injectors to be optimally positioned to discharge treating material through the unoccupied holes in the tie plates with the users being able to move the injectors in relation to themselves, the railroad bed components and enabling the injectors to be moved in relation to the mobile supply of pressurized treating material. The apparatuses provide a highly efficient, flexible and versatile method of treating the interface between the upper surface of wooden ties and the lower surface of tie plates used to anchor rails to the ties while these components remain in place.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. The method of treating wooden railroad ties by injecting flowable treating material through unoccupied spike holes in the tie plate which secures a railroad rail to the tie comprising the steps of providing a mobile supply of pressurized treating material capable of movement in any direction in relation to the railroad rail, engaging an injector with the unoccupied hole in the tie plate, providing manual control means for the injector for manual operation by a user of the injector and connecting the injector with the mobile supply through an elongated flexible tubular member.

2. The method as defined in claim 1 wherein the step of providing a mobile supply of treating fluid includes the provision of a supply tank, mounting the supply tank from the rear surface of the torso of a user in the form of a backpack and providing a manually operated pump to pressurize the treating material.

3. The method as defined in claim 2 in which the step of connecting the mobile supply with the injector includes the provision of an elongated, flexible hose interconnecting the injector and pump.

4. The method as defined in claim 1 wherein said step of providing a mobile supply of treating material includes mounting a supply tank and pump assembly in a land vehicle, the step of connecting the injector with the mobile supply including the provision of an elongated, flexible hose and supporting the flexible hose from a boom mounted on the vehicle and including a vertical mast and laterally extending member supporting the hose in elevated relation to a railroad bed to provide access to the tie plates by the injector.

5. The method as defined in claim 4 wherein the step of supporting the hose includes the step of providing a swivel support for the mast and providing hinge connections in the mast and to the boom for enabling the boom to fold into a collapsed position for transport with the vehicle.

6. The method as defined in claim 5 wherein the step of providing a mobile supply on a land vehicle includes the mounting of the tank and pump assembly and boom on a pickup truck capable of driving along the right-of-way of a railroad bed but not confined to a specific relationship to the railroad rails.

7. An apparatus for injecting wood treating material through unoccupied holes in a railroad rail tie plate secured to a wood tie by spikes comprising a mobile tank and pump assembly movable without constraint laterally, longitudinally and vertically in relation to a railroad rail and tie plates, a flexible hose connected to said mobile tank and pump assembly, a manually manipulated and handles injector connected with said hose, said injector including an elongated, rigid tubular member having a nozzle thereon, resilient means on said nozzle sealingly engaged with an unoccupied spike hole in the tie plate to inject treating material and manually operated valve means controlling discharge of treating material from the nozzle.

8. The apparatus as defined in claim 7 wherein said tank includes mounting straps for supporting engagement with the back of a user thus forming a backpack, said pump assembly being disposed at the lower end of the tank and including an operating handle extending laterally therefrom and forwardly alongside the waist area of the user, said handle having a handgrip positioned adjacent the front waist area of a user to enable manual operation of the pump, said injector including a T-handle at the upper end of the rigid, tubular member with the hose being connected thereto and to the pump assembly at the lower end of ht tank and with the pump handle terminating adjacent the T-handle during use of the injector to enable the user to operate the handle of the pump assembly by moving one hand from the T-handle to the operating handle.

9. The apparatus as defined in claim 7 wherein said tank and pump assembly are mounted in a land vehicle, boom means attached to the land vehicle to support the flexible hose in elevated position for connection with the injector to provide easier access to the tie plates and enable the vehicle to move along the railroad bed right-of-way, said boom means including a pair of vertical sleeves mounted on each side of the vehicle, a sectional, a pair of vertical masts telescopically selectively received in the sellers at either side of the vehicle to enable the vehicle to move along either side of the railroad bed with the sections of the mast being selectively retained in vertical position or folded into a collapsed position inwardly of the confines of the vehicle, a laterally extending boom at the upper end of each mast, means pivotally securing the boom in horizontal position and enabling it to fold alongside the mast with the boom supporting the hose connected with the injector to enable the boom means to be collapsed or extended at either side of the vehicle, said land vehicle being in the form of a pickup truck having a load body with the tank being in the form of a supply drum mounted in the pickup truck body and the pump assembly discharging pressurized treating material through the hose to the injector, said pump assembly including an air operated pump mounted on the supply drum, and an air compressor in said pickup truck load body to power said pump, each boom being foldable into overlying relation to a mast above the side wall of the pickup truck load body.

10. The apparatus as define ed in claim 9 wherein each of said boom means includes a hose supported therefrom with each of said hoses including a Y connection adjacent the outer end of the boom to enable two hoses to be connected to each Y connection for supplying pressurized treating material to four injectors to enable treatment of tie plates on both sides of each rail mounted on a railroad bed.

* * * * *